United States Patent
Sato

(10) Patent No.: US 11,782,661 B2
(45) Date of Patent: Oct. 10, 2023

(54) MONITORING CONTROL APPARATUS, MONITORING CONTROL METHOD, MONITORING SYSTEM, AND MEDIUM

(71) Applicant: Canon Kabushiki Kaisha, Tokyo (JP)

(72) Inventor: Yuichiro Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 17/171,112

(22) Filed: Feb. 9, 2021

(65) Prior Publication Data

US 2021/0247941 A1    Aug. 12, 2021

(30) Foreign Application Priority Data

Feb. 10, 2020  (JP) ................. 2020-020894

(51) Int. Cl.
| | |
|---|---|
| *G06F 3/12* | (2006.01) |
| *H04N 7/18* | (2006.01) |
| *H04N 5/268* | (2006.01) |
| *G06V 20/40* | (2022.01) |
| *G06V 20/52* | (2022.01) |

(52) U.S. Cl.
CPC .......... *G06F 3/1259* (2013.01); *G06F 3/1204* (2013.01); *G06F 3/1261* (2013.01);
(Continued)

(58) Field of Classification Search
CPC .... G06F 3/1259; G06F 3/1204; G06F 3/1261; G06V 20/52; G06V 20/40; G06V 20/44; H04N 5/268; H04N 7/183
(Continued)

(56) References Cited

U.S. PATENT DOCUMENTS

2005/0071495 A1* 3/2005 Kadota ................. G03G 15/55
                                                            709/232
2008/0193146 A1  8/2008 Yamada
(Continued)

FOREIGN PATENT DOCUMENTS

JP    2015-109613 A    6/2015
JP    2015-133020 A    7/2015
(Continued)

OTHER PUBLICATIONS

Co-pending U.S. Appl. No. 17/171,099, filed Feb. 9, 2021.
(Continued)

*Primary Examiner* — Thai Q Tran
*Assistant Examiner* — Nienru Yang
(74) *Attorney, Agent, or Firm* — Venable LLP

(57) ABSTRACT

A monitoring control apparatus is provided. The apparatus comprises a saving unit configured to save identification information of target devices as monitoring targets and areas in corresponding screens for each image capturing unit; a holding unit configured to hold a state of a device used for each job; and a control unit configured to make the image capturing unit capture videos including the target devices and monitor the areas corresponding to the target devices as target areas in a predetermined order, wherein the control unit specifies a next target device in accordance with the predetermined order, and, if there is no job in which a state of the target device is a waiting state, specifies a device next to the target device as a target device in accordance with the predetermined order.

9 Claims, 11 Drawing Sheets

(52) U.S. Cl.
CPC .............. *G06V 20/40* (2022.01); *G06V 20/52* (2022.01); *H04N 5/268* (2013.01); *H04N 7/183* (2013.01); *G06V 20/44* (2022.01)

(58) Field of Classification Search
USPC ........................................................ 348/143
See application file for complete search history.

(56) References Cited

U.S. PATENT DOCUMENTS

| | | | | |
|---|---|---|---|---|
| 2015/0381947 | A1* | 12/2015 | Renkis | G06V 20/52 348/159 |
| 2016/0065430 | A1* | 3/2016 | Hirahara | H04L 41/0853 709/224 |

FOREIGN PATENT DOCUMENTS

| | | |
|---|---|---|
| JP | 2015-197846 A | 11/2015 |
| JP | 2018081713 A | 5/2018 |

OTHER PUBLICATIONS

Athanasios Voulodimos et al.: "A Threefold Dataset for Activity and Workflow Recognition in Complex Industrial Environments", IEEE Multimedia, IEEE Service Center, New York, NY, US, vol. 19, No. 3, Jul. 1, 2012 (Jul. 1, 2012), pp. 42-52, XP011457588, ISSN: 1070-986X, DOI: 10.1109/MMUL.2012.31.

* cited by examiner

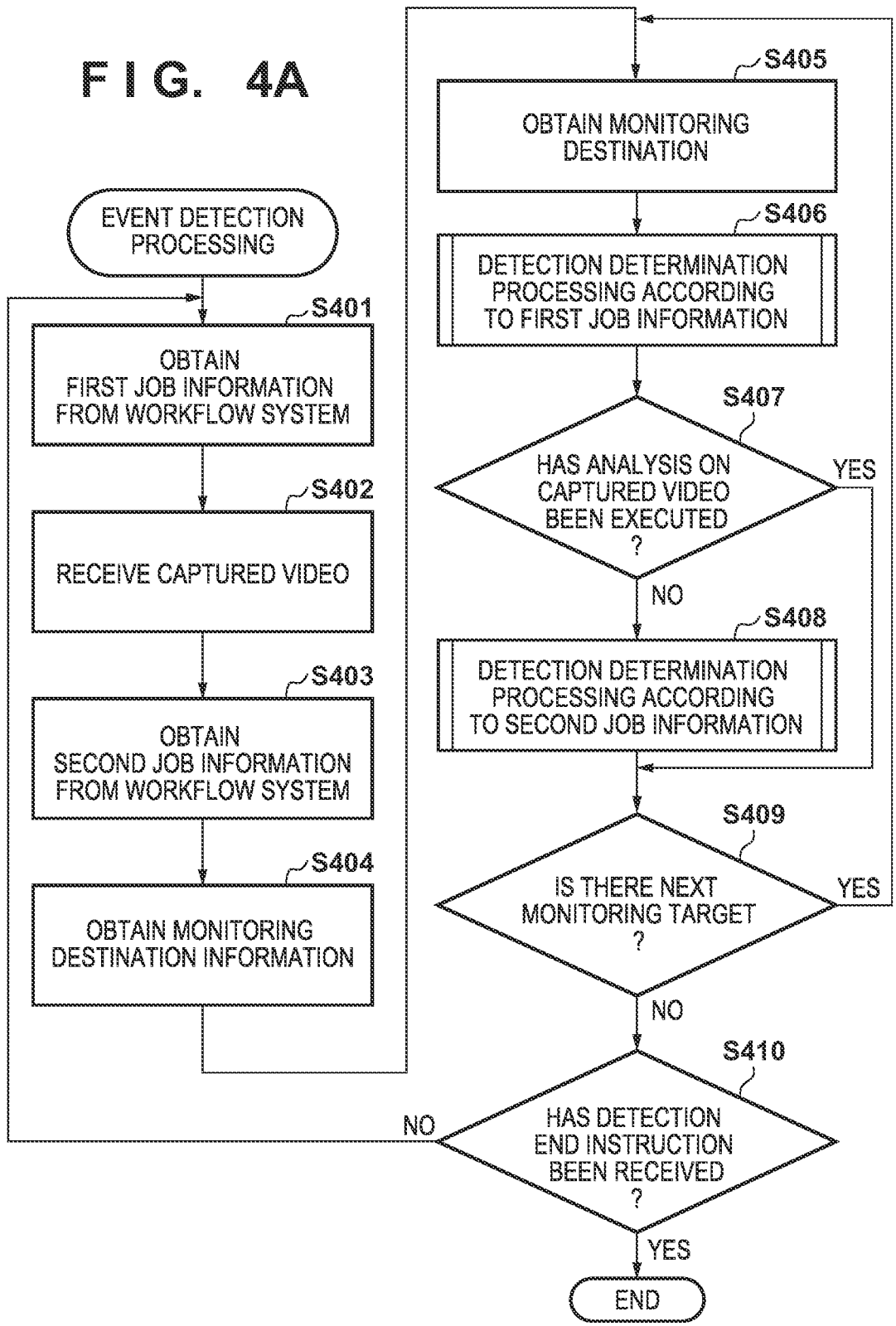

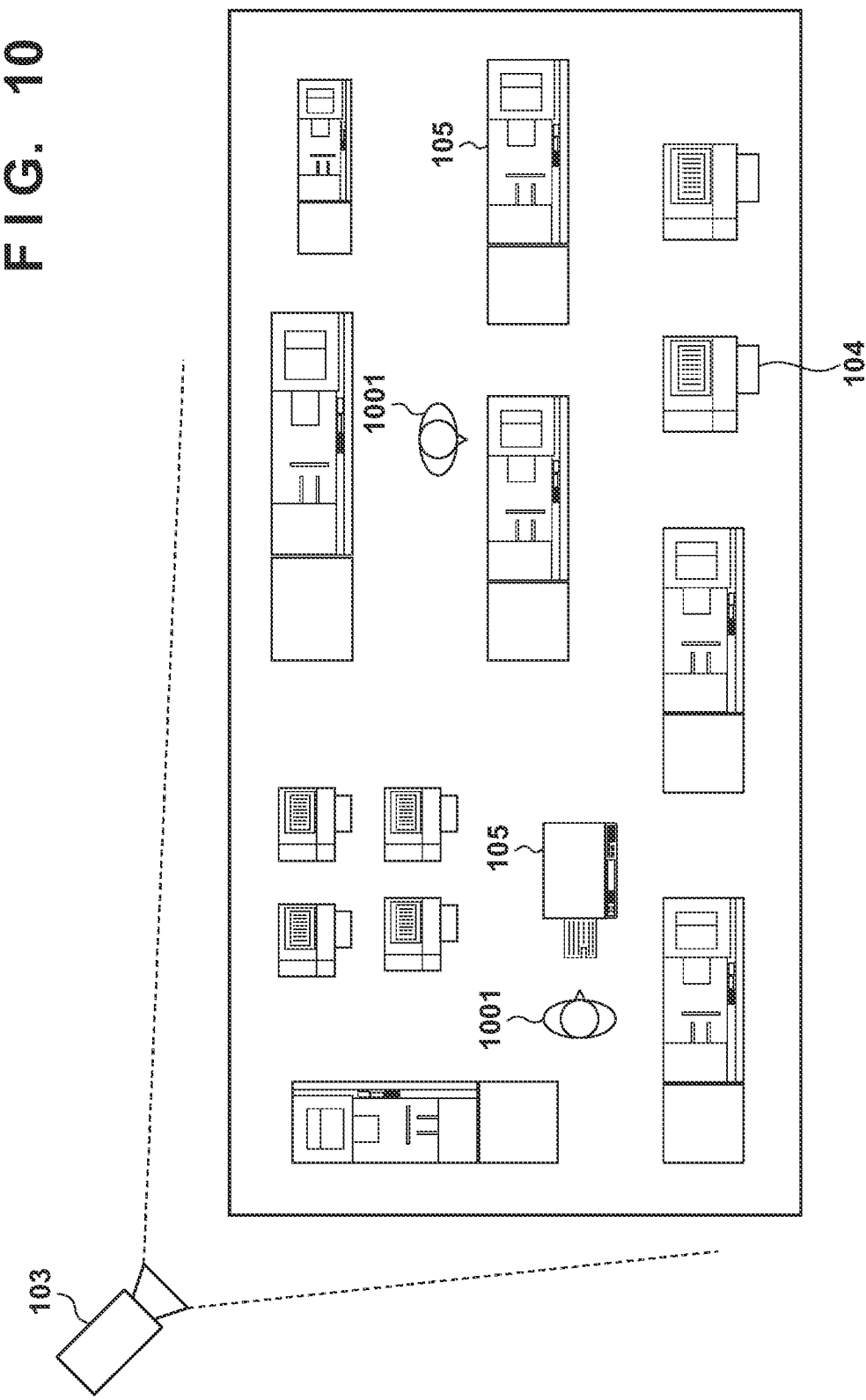

MONITORING CONTROL APPARATUS, MONITORING CONTROL METHOD, MONITORING SYSTEM, AND MEDIUM

BACKGROUND OF THE INVENTION

Field of the Invention

The present invention relates to a monitoring control apparatus, a monitoring control method, a monitoring system, and a medium which are associated with the collection of printing factory operation statuses by, for example, a network camera.

Description of the Related Art

Currently, demands have been raised to collect and analyze device operation states and operation execution states of workers in a printing factory and use the obtained information for improvement activities for productivity improvement. A printer used in a printing factory can collect information about the operation state of a device and notify the collected information to a workflow system as a management system via a network. However, operation states associated with preprocessing operations and postprocessing operations associated with device operations cannot be automatically collected via the printer. Examples of preprocessing operations include confirmation of operation instructions and data, preparation of a device and paper, and test printing. Example of postprocessing operations include product inspection and checkup with instructions.

There has been proposed a mechanism for inputting, via a mobile terminal, operation information such as start and end operations concerning these operations about which no operation information can be obtained via a network, transmitting the input information to an information collecting server, and holding the information in the server (see Japanese Patent Laid-Open No. 2018-81713). However, this method places a burden on a worker and does not guarantee to always record accurate times because the worker inputs information at his/her timings.

There may be a method of collecting information about operation states in a printing factory by operation monitoring with a network camera. A camera connected to a network captures indications on the control panels of a printer and a postprocessor, the lighting state of a pilot lamp, and the state of a worker around a device, detects changes in operation state, and collects corresponding information as events.

Assume that videos depicting a plurality of devices captured by the network camera are to be analyzed to collect information about the operation states. In this case, if there are many devices to be analyzed, it takes much processing time to analyze all areas. On the other hand, since productivity management including preprocessing operation management is required, there is also high necessity to collect preprocessing operation information which cannot be collected from a printer. For this reason, preprocessing operation information cannot be efficiently collected by simply performing video analysis on all the device areas. In addition, some device is not used depending on the state of an order. For example, in the case of a leaflet, a bookbinding machine is not used. Accordingly, if all videos are always analyzed and if an operation similar to a preprocessing operation is performed around the bookbinding machine, the similar operation is sometimes mistakenly detected as a preprocessing operation.

SUMMARY OF THE INVENTION

The present invention reduces the overlooking and false detection of changes in the operation states of monitoring target devices by switching the monitoring targets in accordance with the statuses of the monitoring target devices.

The present invention has the following configuration. That is, according to one aspect of the present invention, there is provided a monitoring control apparatus comprising: at least one memory; and at least one processor wherein when executing a program stored in the at least one memory, the processor causes the apparatus to operate as: a saving unit configured to save identification information of target devices as monitoring targets and areas in corresponding screens for each image capturing unit; a holding unit configured to hold a state of a device used for each job; and a control unit configured to make the image capturing unit capture videos including the target devices and monitor the areas corresponding to the target devices as target areas in a predetermined order, wherein the control unit specifies a next target device in accordance with the predetermined order, and, if there is no job in which a state of the target device is a waiting state, specifies a device next to the target device as a target device in accordance with the predetermined order.

According to another aspect of the present invention, there is provided a monitoring system comprising: a monitoring control apparatus; an image capturing apparatus configured to capture an image of a monitoring target device; and an information processing apparatus configured to receive an event from the monitoring control apparatus and display the event on a user interface, wherein the monitoring control apparatus includes at least one memory; and at least one processor wherein when executing a program stored in the at least one memory, the processor causes the apparatus to operate as: a saving unit configured to save identification information of target devices as monitoring targets and areas in corresponding screens for each image capturing apparatus, a holding unit configured to hold a state of a device used for each job, a control unit configured to make the image capturing apparatus capture videos including the target devices and monitor the areas corresponding to the target devices as target areas in a predetermined order, a detection unit configured to detect an event concerning the target device from the area corresponding to the target device based on the video captured by the image capturing apparatus, and a unit configured to transmit the detected event to an information processing apparatus that displays the event on a user interface, and the control unit specifies a next target device in accordance with the predetermined order, and, if there is no job in which a state of the target device is a waiting state, specifies a device next to the target device as a target device in accordance with the predetermined order.

According to the present invention, it is possible to reduce the overlooking and false detection of changes in the operation states of monitoring target devices by switching the monitoring targets in accordance with the statuses of the monitoring target devices.

Further features of the present invention will become apparent from the following description of exemplary embodiments with reference to the attached drawings.

BRIEF DESCRIPTION OF THE DRAWINGS

FIGS. 4A and 4B are flowcharts for explaining an event detection method and a detection determination method according to this embodiment;

FIG. 10 is a view showing an example of the video captured by a network camera 103 according to this embodiment.

DESCRIPTION OF THE EMBODIMENTS

First Embodiment

Figure 1:
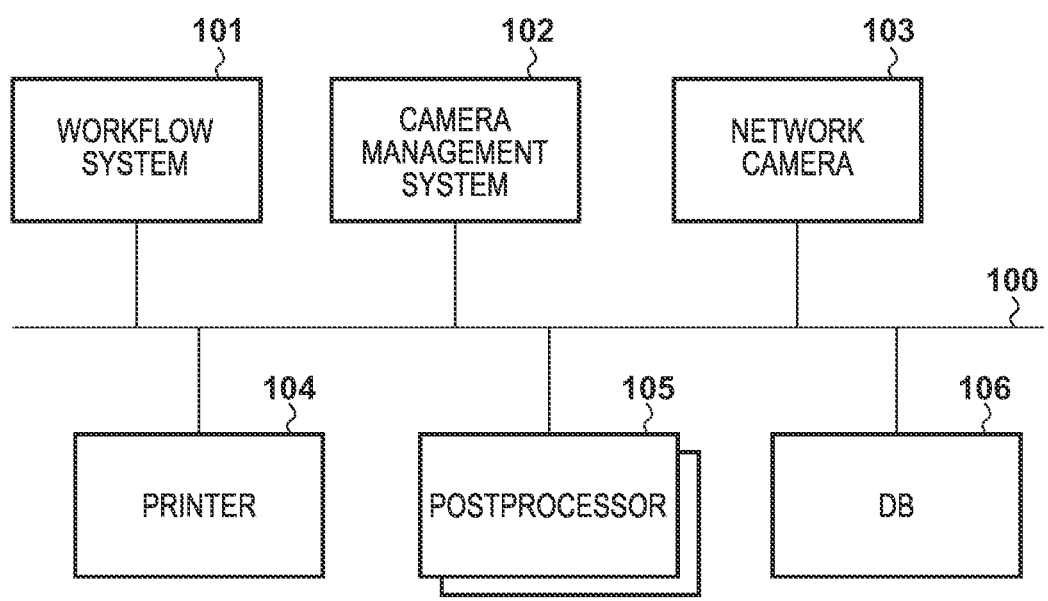
FIG. 1 is a block diagram showing the overall configuration of an event collection system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<System Configuration>

FIG. 1 is a block diagram showing the configuration of an event collection system according to this embodiment. The event collection system includes a workflow system 101, a camera management system 102, a network camera 103, a printer 104, a postprocessor 105, and a DB 106 which are configured to be communicable with each other via a network 100. In this case, the printer 104 is network-connected to the workflow system 101. The embodiment will exemplify a case in which there are a plurality of postprocessors 105 that perform postprocessing (edge trimming, bookbinding, and the like) after printing, and the respective postprocessors are network-connected. Note, however, that this system may include a plurality of printers 104 and may not include a plurality of postprocessors 105. The network is, for example, a so-called communication network implemented by a LAN such as the Internet, WAN, telephone line, or the like, and may be at least capable of transmitting and receiving data. Note that the event collection system can be regarded as a monitoring system that monitors devices to be observed.

The workflow system 101 is a system that manages printing by the printer 104 and postprocessing by the postprocessor 105, and manages job information including print data, print settings, device settings of postprocessors, and process information which are used for order production. In addition, the workflow system 101 receives and manages device operation states and process start and end instructions from the printer 104 and the postprocessor 105.

The workflow system 101 may be implemented by programs executed by an information processing apparatus. The workflow system 101 generates a print job and a postprocessing job to be transmitted to devices connected via the network based on information such as document data as source data, a format (print settings), and postprocessing settings, and transmits the jobs to the respective devices. In addition, the workflow system 101 generates instructions for instructing a processing procedure and presents the instructions as a printed product data to the operator. The operator makes preparations for printing and postprocessing by each device, that is, preprocessing operations, in accordance with the instructions and causes each device to execute a target process. The preprocessing operations include, for example, moving an output from a front-stage device in accordance with instructions and placing the output at a predetermined position on a next-stage device. Note that in this embodiment, a series of processes up to finishing one document into a printed product is called a job, and the unit of processing included in the job is called a process. However, when a given process is executed by a printer or postprocessor, operation instruction information generated by a workflow system concerning the process or processing based on the operation instruction information is sometimes called a "job". For example, such jobs include a print job and a processing job by a postprocessor.

The camera management system 102 manages a plurality of network cameras 103. The camera management system 102 instructs the network cameras 103 to perform capturing and receives the captured videos. In addition, the camera management system 102 detects the presence/absence of preprocessing operations for the respective devices, including the printer 104 and the postprocessor 105, from the received videos, and transmits the corresponding information as events to the DB 106. The camera management system 102 may be implemented by the programs executed by an information processing apparatus. The camera management system controls the monitoring function implemented by the monitoring control system, and hence can also be called a monitoring control apparatus. A monitoring control method is executed by the processing executed by the monitoring control apparatus.

The printer 104 receives print data and print settings from the workflow system 101 and performs printing. Accompanying such operations, the printer 104 transmits, to the workflow system 101, its own device states (such as in progress, normal termination, error termination, and waiting state) together with information that can specify a job and a process. The postprocessor 105 receives the device settings of a postprocessing device from the workflow system 101 and performs postprocessing. Accompanying such operations, the postprocessor 105 transmits, to the workflow system 101, its own device states (such as in progress, normal termination, error termination, and waiting state) together with information that can specify a job and a process. The DB 106 receives and holds events from the camera management system 102. The DB 106 also generates an image that allows checking of the operation state of a printing factory from job information and events from the workflow system 101 in accordance with a request from a client PC (not shown).

<Hardware Configuration>

Figure 2A:
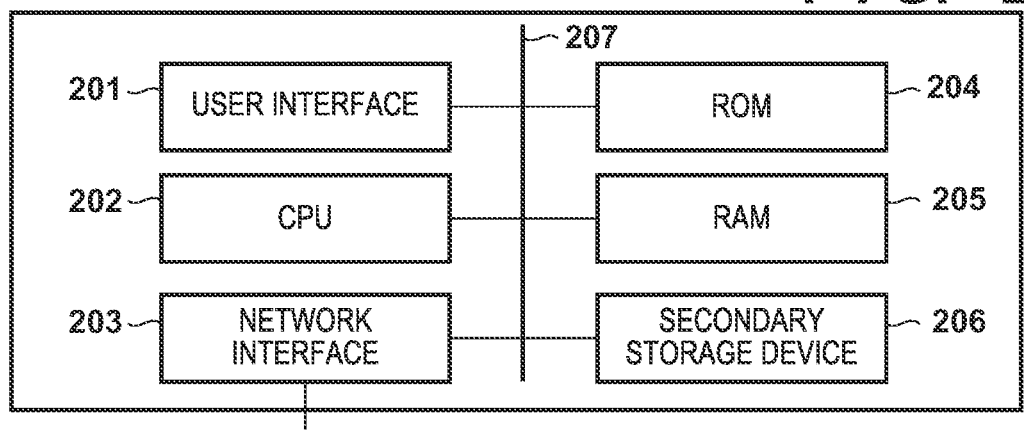
FIGS. 2A, 2B, and 2C are block diagrams showing hardware configurations according to this embodiment.

FIG. 2A is a block diagram showing the hardware configurations of the workflow system 101, the camera management system 102, and the DB 106 in FIG. 1.

A user interface 201 allows the user to input and output information using a display, keyboard, mouse, touch panel, and the like. A network interface 203 is connected to the network 100 such as a LAN to communicate with other computers and network devices. Incorporated programs and data are recorded in a ROM 204. A RAM 205 is a temporary storage area. A secondary storage device 206 is a secondary storage typified by an HDD. A CPU 202 executes programs read out from the ROM 204, the RAM 205, the secondary storage device 206, and the like. Each unit is connected via a bus 207.

Figure 2B:
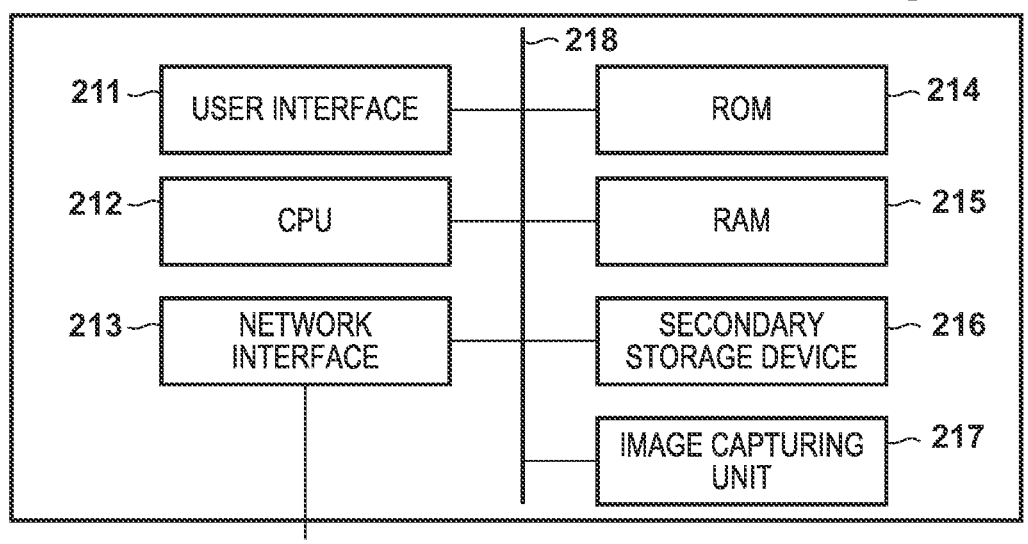

FIG. 2B is a block diagram showing the hardware configuration of the network camera 103 in FIG. 1. A user interface 211 allows connection and operation from another computer via the remote shell. A network interface 213 connects to a network such as a LAN to communicate with another computer or network device. Incorporated programs and data are recorded in a ROM 214. A RAM 215 is a temporary memory area.

A secondary storage device 216 is a secondary storage typified by an HDD. A CPU 212 executes programs read out from the ROM 214, the RAM 215, the secondary storage device 216, and the like. An image capturing unit 217 includes a CCD and stores the videos obtained by capturing images of imaging targets in the secondary storage device 216. Each unit is connected via a bus 218.

Figure 2C:
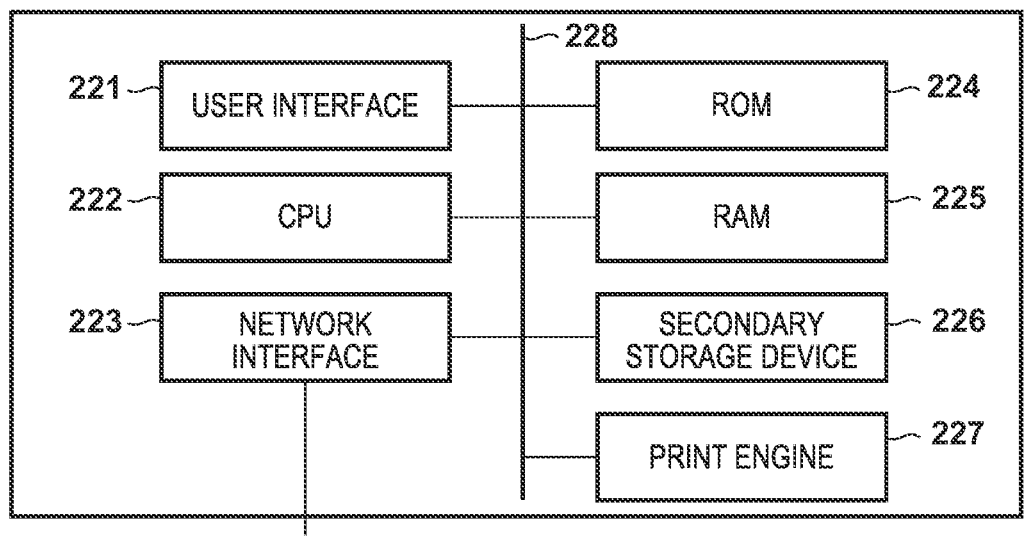

FIG. 2C is a block diagram showing the hardware configuration of the printer 104 in FIG. 1. A user interface 221 allows the user to input and output information by using a display, keyboard, touch panel, and the like. A network interface 223 is connected to the network 100 such as a LAN to communicate with other computers and network devices. Incorporated programs and data are recorded in a ROM 224. A RAM 225 is a temporary storage area. A secondary storage device 226 is a secondary storage typified by an HDD. A CPU 222 executes programs read out from the ROM 224, the RAM 225, the secondary storage device 226, and the like. A print engine 227 prints data on paper (sheet). Each unit is connected via a bus 228. The postprocessor 105 may have a configuration obtained by replacing the print engine 227 of the configuration in FIG. 2C with a device for postprocessing.

<Software Configuration>

FIGS. 3A to 3F show the software configurations of the workflow system 101, the camera management system 102, the network camera 103, the printer 104, the postprocessor 105, and the DB 106 shown in FIG. 1. The operations of these components will be described below. The CPU implements these operations by executing programs saved in the memories of the respective devices.

Workflow System

Figure 3A:
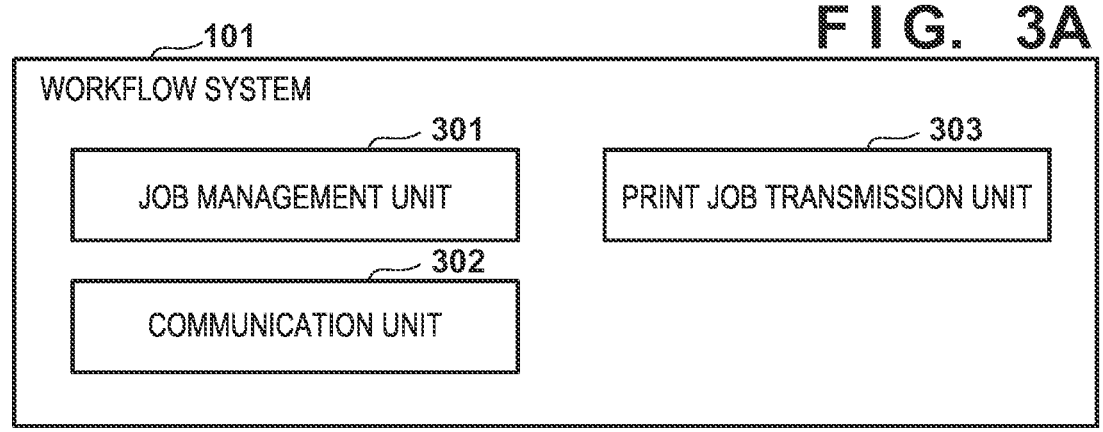
FIGS. 3A to 3F are block diagrams showing software configurations according to this embodiment.

The workflow system 101 shown in FIG. 3A includes a job management unit 301, a communication unit 302, and a print job transmission unit 303. The job management unit 301 of the workflow system 101 manages, as job information, information about a production process for producing an ordered product. Table 1 illustrates an example of part of job information managed by the job management unit 301. For the sake of description, this table shows a case in which there are three jobs. Job information is often information about many jobs to be processed in a given day.

TABLE 1

| Job ID | Process ID | Device ID | Status | Start Date and Time | End Date and Time |
|---|---|---|---|---|---|
| job_001 | p_001 | Device_A | in progress | 2019-11-21T 11:50:00Z | |
| job_001 | p_002 | Device_C | waiting | | |
| job_002 | p_001 | Device_A | waiting | | |

TABLE 1-continued

| Job ID | Process ID | Device ID | Status | Start Date and Time | End Date and Time |
|---|---|---|---|---|---|
| job_003 | p_001 | Device_B | normal termination | 2019-11-21T 11:00:00Z | 2019-11-21T 11:20:00Z |

Job information is a data table for managing production processes and production states of ordered products managed by the workflow system 101, and is constituted by "job ID", "process ID", "device ID", "status", "start date and time", and "end date and time".

"Job ID" is an ID for identifying an ordered product managed by the workflow system 101, and is constituted by a plurality of process IDs (to be described later). "Process ID" is an ID for uniquely identifying an operation process constituting a job, including printing by the printer 104 and bookbinding, cutting, and the like by the postprocessor 105. Processes are sequenced, and the order of the processes can be discriminated by comparing the magnitudes of the process IDs in this embodiment. According to the example illustrated by Table 1, there are jobs for producing three ordered products. The job "job_001" is constituted by the processes "p_001" and "p_002" in this order, and the remaining jobs each are constituted by a single process.

"Device ID" includes IDs for uniquely identifying devices as the printer 104 and the postprocessor 105 which are used in an operation process. "Status" represents the execution state of an operation process. In this embodiment, "status" includes "waiting" as a state before the start of an operation process, "in progress" as an operating state of each of the printer 104 and the postprocessor 105, and "normal termination" as a state after the completion of the operation process. However, "status" may include other statuses.

"Start date and time" is the operation start date and time of an operation process, and "end date and time" is the operation end date and time of the operation process. Such pieces of information are added as the above status is changed in accordance with a device operation state notification request from the printer 104 (to be described later) or a client PC (not shown).

The job management unit 301 receives a device operation state notification request including a device ID, a device operation state, and a process ID from the printer 104 or a client PC (not shown). The job management unit 301 then updates the status of the job information, the start date and time, and the end date and time in accordance with the contents of the received device operation state notification request.

For example, the printer 104 receives a print job including the job ID "job_001" and the process ID "p_001" from the workflow system 101, and executes print processing. Upon starting the print processing, the printer 104 detects a change in the device state of the printer 104 itself as an event. The printer 104 transmits a device operation state notification request including the device ID "Device_A", the job ID "job_001", the process ID "p_001", and the device operation state "printing" in accordance with the event. At this time, the job management unit 301 searches the job information for a record matching the job ID and the process ID. If the status of the corresponding record is "waiting", the job management unit 301 regards that the operation process proceeds to an operation state, and changes the status of the record to "in progress". In addition, the job management unit 301 sets the request reception time as the time when the status is changed to "in progress" to the start date and time.

If there is no corresponding record, the job management unit 301 adds a new record and registers the value of each item of the received information.

Upon completion of print processing, the printer 104 transmits a device operation state notification request including the device ID "Device_A" of the printer 104 itself, the job ID "job_001", the process ID "p_001", and the device operation state "end of printing" in accordance with the event. At this time, the job management unit 301 searches the job information for a record matching the job ID and the process ID. If the status of the record is "in progress", regarding that the operation process is set in a completion state, the job management unit 301 changes the status of the record to "normal termination". In addition, the job management unit 301 sets the request reception time as the time when the status is changed to "normal termination" to the end date and time.

Like the printer 104, the postprocessor 105 transmits an operation state notification request via the network in accordance with the occurrence of an event. Although this embodiment exemplifies a case in which the postprocessor 105 is connected to the network, the present invention is also applicable to even the postprocessor 105 that cannot transmit an operation state notification request via the network. When using the postprocessor 105 that is not network-connected, the worker generates and transmits an operation state notification request from a tablet or client PC (not shown).

In addition, the job management unit 301 receives job information acquisition requests from the camera management system 102 and the DB 106 and transmits job information as responses.

The print job transmission unit 303 issues a print instruction by transmitting print data as a print job, together with a job ID and a process ID, to the printer 104 via the communication unit 302. A processing job transmission unit 304 issues a processing instruction by transmitting the device settings of a postprocessor as a processing job, together with a job ID and a process ID, to the postprocessor 105 via the communication unit 302.

Camera Management System

Figure 3B:
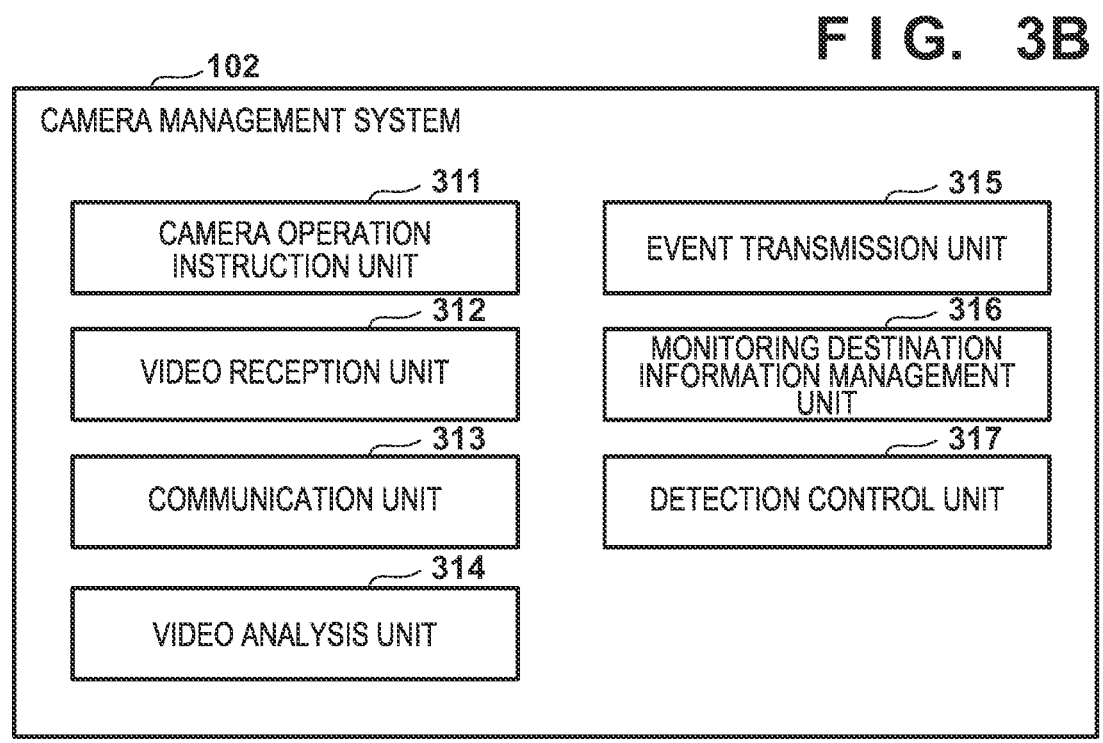

The camera management system 102 shown in FIG. 3B includes a camera operation instruction unit 311, a video reception unit 312, a communication unit 313, a video analysis unit 314, an event transmission unit 315, a monitoring target information management unit 316, and a detection control unit 317.

The camera operation instruction unit 311 issues a capturing instruction to the network camera 103 via the communication unit 313. The video reception unit 312 receives the video captured by the network camera 103, that is, the captured video. The video analysis unit 314 performs video analysis on the received captured video, such as human detection and detection of the lighting of a device control lamp, and determines a preprocessing operation state to determine whether a preprocessing operation is in progress. The event transmission unit 315 transmits the determination result on the preprocessing operation state and the device ID and time (to be described later) as an event to the DB 106 via the communication unit 313.

Table 2 illustrates an example of the monitoring target information managed by the monitoring target information management unit 316.

TABLE 2

| Camera ID | Monitoring target Device ID | Area | Analysis Method |
|---|---|---|---|
| Cam_A | Device_A | (120, 65) (100, 100) | human detection |
| Cam_A | Device_B | (53, 23) (200, 150) | human detection |
| Cam_A | Device_C | (356, 24) (80, 90) | lamp detection |

Monitoring target information is a data table for managing the network camera 103 and monitoring target devices managed by the camera management system 102 as monitoring targets together with video areas and video analysis methods, and is constituted by "camera ID", "monitoring target device ID", "area", and "analysis method".

"Camera ID" is an ID for uniquely identifying the network camera 103 managed by the camera management system 102. "Monitoring target device ID" includes IDs for uniquely identifying the printer 104 and the postprocessor 105 specified by the camera ID and the areas described above. That is, "monitoring target device ID" is the identification information of a monitoring target device. "Area" holds the value of an area in an image of a video obtained from the network camera. This value may indicate, for example, the coordinates of two points constituting diagonal points of a rectangular area including an analysis target area, such as a monitoring target device and its periphery. Obviously, the above value may be the coordinates of each contour point indicating an area having a more complicated shape or may be indicated by another method. Performing analysis processing (to be described above) for this area can detect whether a preprocessing operation at a monitoring target device ID has been performed. "Analysis method" is analysis processing for a captured video and indicates which analysis processing is to be used to detect the presence/absence of a preprocessing operation. In other words, "analysis method" indicates a detection target.

"Analysis method" designates the processing of determining, in the case of "human detection", that the time in which a human is detected in a video is a preprocessing operation time and determining, in the case of "detection of lighting of lamp", that the time in which a lamp such as a device cover open/close state lamp is lighted is a preprocessing operation time.

In the case of Table 2, in the videos captured by the camera with the camera ID "Cam_A", monitoring targets where preprocessing operations are to be detected are respectively associated with three devices, namely the device "Device_A", the device "Device_B", and the device "Device_C". For example, at the monitoring target on the first row, there is set an analysis method including specifying the time in which a human is detected from the video captured by the camera with "Cam_A" within the area "(120, 65), (100, 100)" and determining the detected time as a preprocessing operation time in which the device "Device_A" has performed the operation.

In principle, the detection control unit 317 controls the capturing of a monitoring target by the network camera 103 and video analysis on a monitoring target area in accordance with monitoring target information. In addition, the detection control unit 317 obtains job information from the workflow system 101 and determines whether to perform analysis on a video corresponding to a specific one of the devices included in the above monitoring target information. That is, even for a device set as a monitoring target, the detection control unit 317 performs control to skip analysis on a video area corresponding to the device in accordance with job information.

Network Camera

Figure 3C:
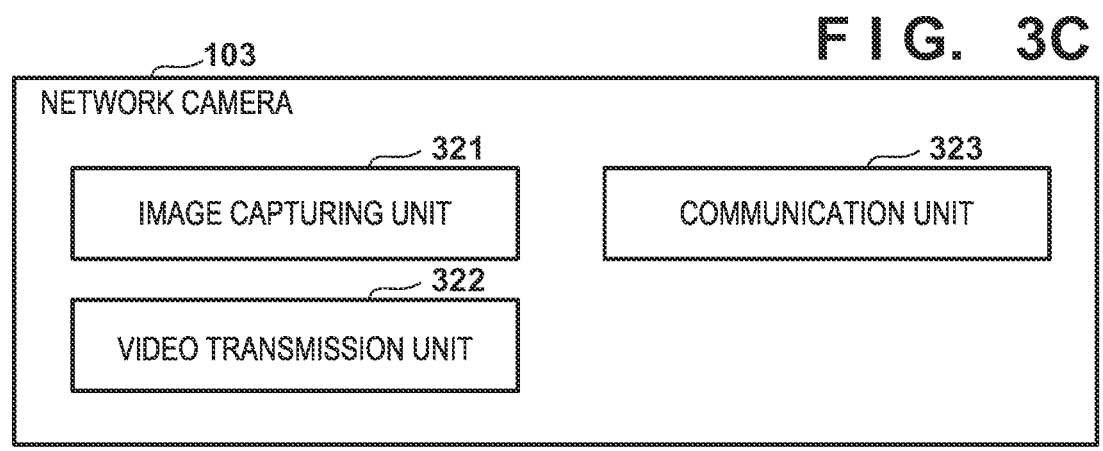

The network camera 103 shown in FIG. 3C includes an image capturing unit 321, a video transmission unit 322, and a communication unit 323. The image capturing unit 321 performs image capturing with the camera upon receiving a capturing instruction from the camera management system 102 via the communication unit 323. The video transmission unit 322 transmits the video captured by the image capturing unit 321 to the camera management system 102 via the communication unit 323. As shown in FIG. 10, the network camera 103 can capture a video in a wide range including a monitoring target.

Printer

Figure 3D:
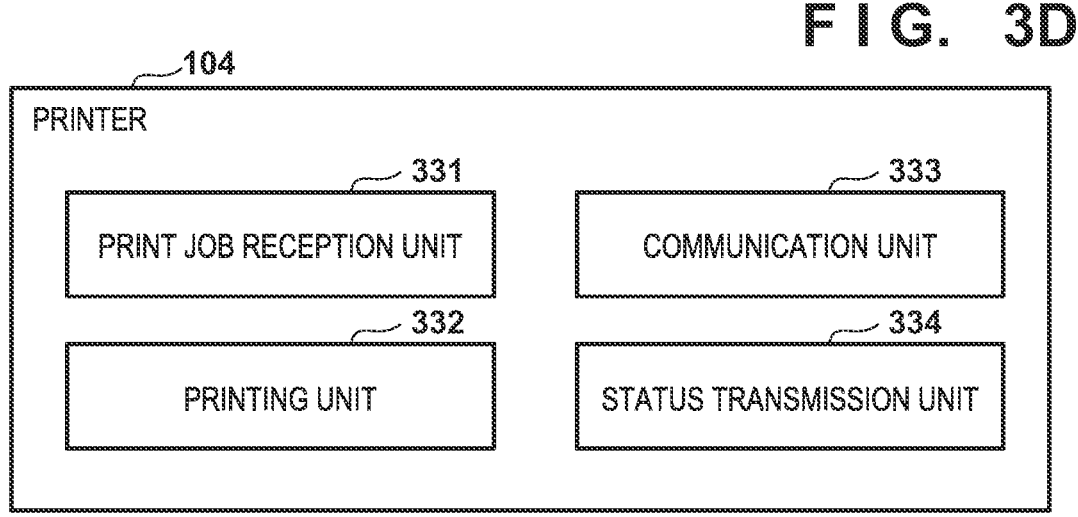

The printer 104 shown in FIG. 3D includes a print job reception unit 331, a printing unit 332, a communication unit 333, and a status transmission unit 334. The print job reception unit 331 receives the print job transmitted from the workflow system 101 via the communication unit 333, and the printing unit 332 performs print output. In addition, the status transmission unit 334 detects a change in own device status (for example, in progress, error termination, normal termination, or waiting) if any. The status transmission unit 334 then transmits the status after the change, together with the job ID received with the print job (that is, the job corresponding to the change in device state) and a process ID, as an operation state notification request to the workflow system 101.

Postprocessor

Figure 3E:
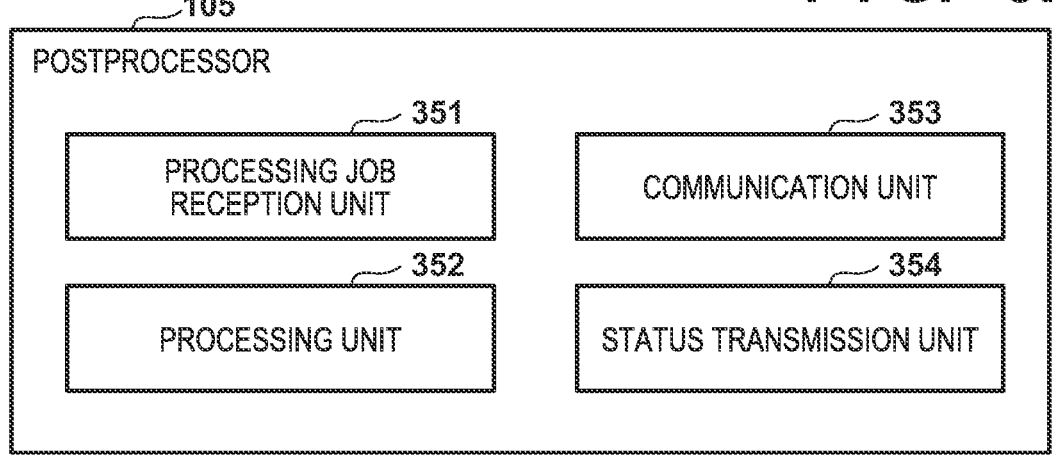

The postprocessor 105 shown in FIG. 3E includes a processing job reception unit 351, a processing unit 352, a communication unit 353, and a status transmission unit 354. The processing job reception unit 351 receives the processing job transmitted from the workflow system 101 via the communication unit 353, and the processing unit 352 performs postprocessing. In addition, the status transmission unit 354 detects a change in own device status (for example, in progress, error termination, normal termination, or waiting) if any. The status transmission unit 354 then transmits the status after the change, together with the job ID received with the print job (that is, the job corresponding to the change in device state) and a process ID, as an operation state notification request to the workflow system 101.

Database (DB)

Figure 3F:
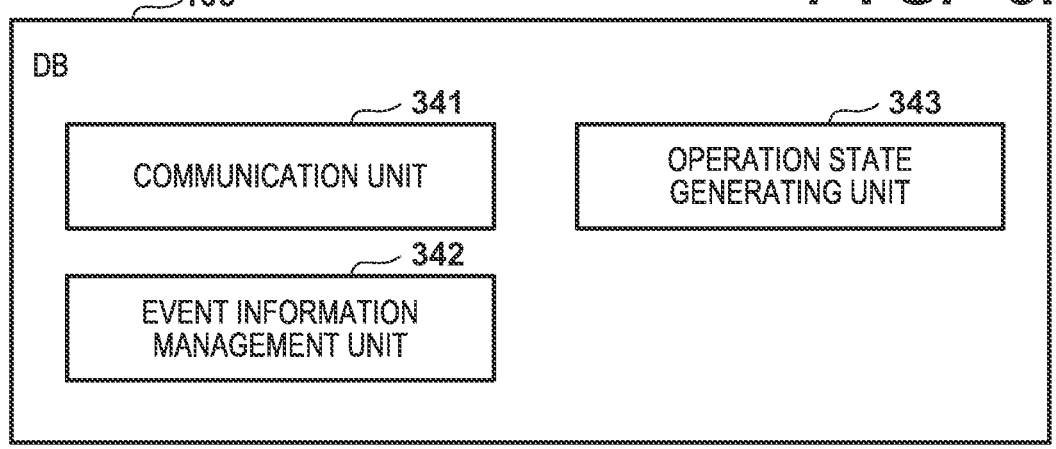

The DB 106 shown in FIG. 3F includes a communication unit 341, an event information management unit 342, and an operation state generating unit 343. The event information management unit 342 receives the event transmitted from the camera management system 102 via the communication unit 341 and manages the event as event information (to be described later). Table 3 illustrates an example of event information managed by the event information management unit 342.

TABLE 3

| Detection Start Date and Time | Detection End Date and Time | Device ID |
| --- | --- | --- |
| 2019-11-21T10:31:00Z | 2019-11-21T10:32:00Z | Device_B |
| 2019-11-21T10:34:00Z | 2019-11-21T10:35:00Z | Device_B |
| 2019-11-21T10:41:00Z | 2019-11-21T10:42:00Z | Device_B |
| 2019-11-21T10:44:00Z | 2019-11-21T10:45:00Z | Device_B |
| 2019-11-21T11:46:00Z | 2019-11-21T11:46:45Z | Device_A |

Event information is constituted by the detection start date and time when a preprocessing operation is started, the detection end date and time when the preprocessing operation is ended, and the device ID indicating the device by which the preprocessing operation is executed.

According to Table 3, for example, the record on the first row indicates that a preprocessing operation has been done by the device with the device ID "Device_B". The period of the operation is from the detection start date and time "2019-11-21T10:31:00Z" to the detection end date and time "2019-11-21T10:32:00Z".

The operation state generating unit 343 generates a screen displaying preprocessing operations by the respective devices and the device operation states from job information and event information from the workflow system 101 in accordance with an operation state screen acquisition request from a client PC (not shown).

<Event Detection Processing>

FIG. 4A is a flowchart for explaining an event detection processing method in the camera management system 102 according to this embodiment. Note that the CPU 202 implements each step by executing a stored control program.

In step S401, the detection control unit 317 transmits a job information acquisition request to the workflow system 101 via the communication unit 313. In response to this request, the workflow system 101 obtains, as first job information, all job information about a processing target before the capturing of a video obtained in step S402. For example, job information like that illustrated in Table 1 is obtained in this case.

In step S402, the camera operation instruction unit 311 transmits a capturing instruction to the network camera 103 with the camera ID included in monitoring target information via the communication unit 313. In the case of Table 2, a capturing instruction is transmitted to "Cam_A". If a plurality of camera IDs are included in the monitoring target information, the camera operation instruction unit 311 transmits capturing time information to all the cameras. At this time, the camera operation instruction unit 311 transmits the capturing instruction including the capturing time (not shown). This capturing time is a predetermined time, indicates the length of a captured video during which detection processing is performed once, and may take any value, for example, a fixed value of "60 sec". Upon receiving the capturing instruction including the capturing time, the image capturing unit 321 of the network camera 103 captures a video only for the capturing time instructed from the camera operation instruction unit 311. After the capturing operation, when the video transmission unit 322 transmits the captured video to the camera management system 102, the video reception unit 312 receives the video captured by "Cam_A".

In this embodiment, in step S402, the network camera 103 starts to perform video capturing in response to an instruction from the camera management system 102. Alternatively, the network camera 103 may be configured to always perform video capturing and transmission, while the camera management system 102 may be configured to obtain necessary videos.

In step S403, the detection control unit 317 transmits a job information acquisition request to the workflow system 101 via the communication unit 313. In response to this request, the workflow system 101 obtains all job information about a processing target after capturing of the video obtained in step S402 as second job information. In this case, the workflow system 101 obtains job information after video capturing. If there is a job whose state (status) has changed during the capturing operation, the status of the job should differ from the status of the job information obtained in step S401.

In step S404, the detection control unit 317 obtains, via the monitoring target information management unit 316, all monitoring targets where the camera with the camera ID included in monitoring target information (Table 2) captures analysis target videos. Table 2 includes only the camera ID "Cam_A" and the three devices, namely "Device_A", "Device_B", and "Device_C", as monitoring targets corresponding to "Cam_A", that is, monitoring target devices.

In step S405, the detection control unit 317 sequentially reads out the monitoring targets as monitoring target settings obtained in step S404, and obtains monitoring target device IDs. That is, the detection control unit 317 obtains the monitoring target device IDs in a predetermined order.

In step S406, the camera management system 102 analyzes a video of a monitoring target device ID at a monitoring target among the videos obtained in step S402 and transmits event information in accordance with the first job information. In this step, the camera management system 102 detects an event from a monitoring target area (that is, a target area). The camera management system 102 may analyze a video corresponding to a monitoring target device ID by, for example, an analysis method corresponding to the monitoring target device ID with respect to an image included in an area corresponding to the monitoring target device ID. This processing will be described in detail later.

In step S407, the detection control unit 317 determines whether analysis on a video at a monitoring target and event detection in a preprocessing process have been executed in step S406. More specifically, the detection control unit 317 determines whether processing in steps S412 and S413 (to be described later) has been executed. If the processing in steps S412 and S413 has been executed, the detection control unit 317 executes processing in step S409. If the processing in steps S412 and S413 has not been executed, the detection control unit 317 executes processing in step S408 (to be described later).

In step S408, the camera management system 102 analyzes a video of a monitoring target device ID at a monitoring target among the videos obtained in step S402 and transmits event information in accordance with the second job information. In this step, the camera management system 102 detects an event from a monitoring target area. This processing will be described in detail later. In this manner, the camera management system 102 performs detection determination again in step S408 by using the second job information obtained at a timing after the acquisition of the video. This makes it possible to detect a change in operation state even if the status of job information changes from, for example, "in progress" to "waiting" within the time of the video obtained in step S402.

In step S409, the detection control unit 317 determines whether a next monitoring target can be obtained. If a next monitoring target cannot be obtained, for example, in the case of Table 2, if event detection at all the three monitoring targets has been completed, the process shifts to step S410. If a monitoring target can be obtained in step S409, that is, processing concerning all the monitoring targets has not been completed, the process returns to step S405.

In step S410, the camera operation instruction unit 311 checks whether a detection end instruction has been received. If a detection end instruction has been received, the processing is terminated. If a detection end instruction has not been received, the process returns to step S401 to repeat the event detection processing.

Figure 4B:
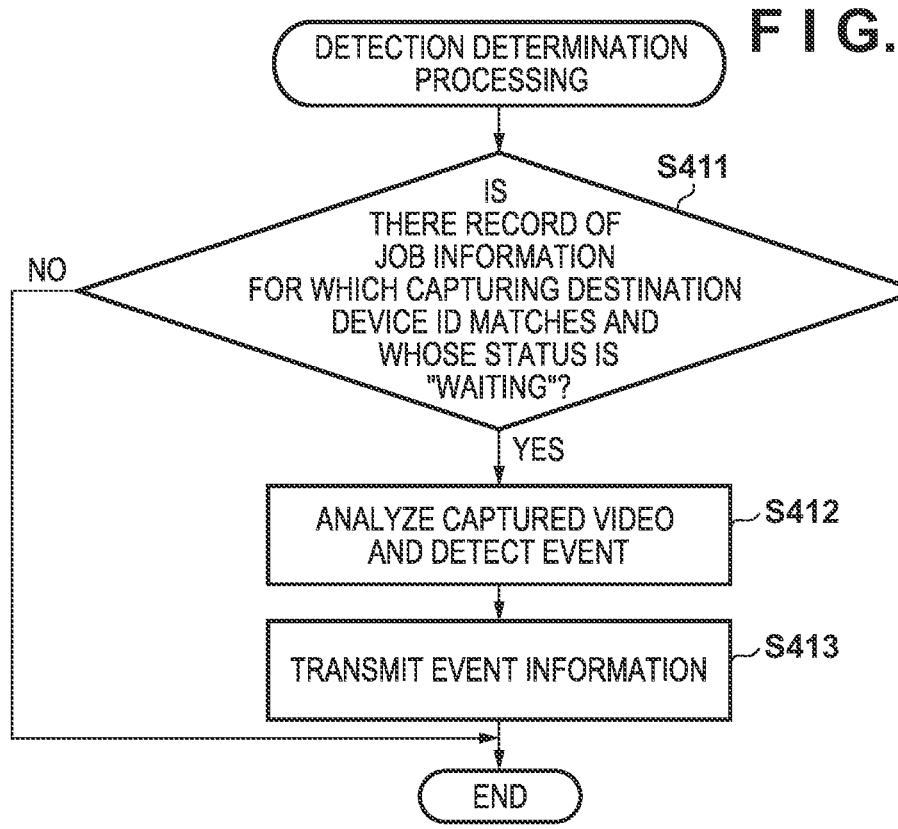

FIG. 4B is a flowchart for explaining a detection determination method in the camera management system 102 according to this embodiment. This processing is executed in steps S406 and S408 in FIG. 4A. Subsequently, assume that when the detection determination method in FIG. 4B is executed as processing in step S406, first job information is used as job information, whereas when the method is executed as processing in step S408, second job information is used as job information.

In step S411, the detection control unit 317 determines whether the job information obtained in step S401 or S403 includes a record including the status "waiting" corresponding to a device ID that a monitoring target device ID included in the monitoring target settings matches. If, for example, the monitoring target device ID included in the monitoring target settings is "Device_A" and if job information is in a state like that illustrated in Table 1, the detection control unit 317 determines that there is a record including the status "waiting" (see the third row in Table 1).

Upon determining in step S411 that there is no record including the status "waiting", the detection control unit 317 terminates the processing. If there is a record including the status "waiting", the detection control unit 317 determines that a preprocessing operation may be performed, and executes step S412 (to be described later).

In step S412, the video analysis unit 314 obtains an area and an analysis method which correspond to the monitoring target device ID that is determined in step S411 as corresponding to "waiting" from the monitoring target information management unit 316, and performs analysis in the captured video area in accordance with the analysis processing. For example, in the case of "human detection", the video analysis unit 314 performs analysis to check whether a human is depicted in a captured video in a corresponding area. In the case of "detection of lighting of lamp", the video analysis unit 314 performs analysis to check whether the control lamp is lighted, and also performs analysis to check whether a preprocessing operation has been executed. In the case of "human detection", when a human is detected in a captured video in a corresponding area, the video analysis unit 314 determines that a preprocessing operation has been executed. In the case of "detection of lighting of lamp", when the lighting of the control lamp is detected in a captured video in a corresponding area, the video analysis unit 314 determines that a preprocessing operation has been executed. If a preprocessing operation is detected, the video analysis unit 314 transmits the detection date and time as event information to the DB 106 in step S413. As the detection date and time, the date and time included as attributes of video information may be extracted and used.

In step S413, the event transmission unit 315 transmits a device ID corresponding to the monitoring target and the detection start date and time and end date and time of the preprocessing operation detected by video analysis in step S411 as event information to the DB 106 via the communication unit 313. The DB 106 registers the received information as event information like that illustrated in Table 3.

As described above, the camera management system 102 performs event detection processing with the network camera 103.

<Generation of Operation State Screen>

Figure 5:
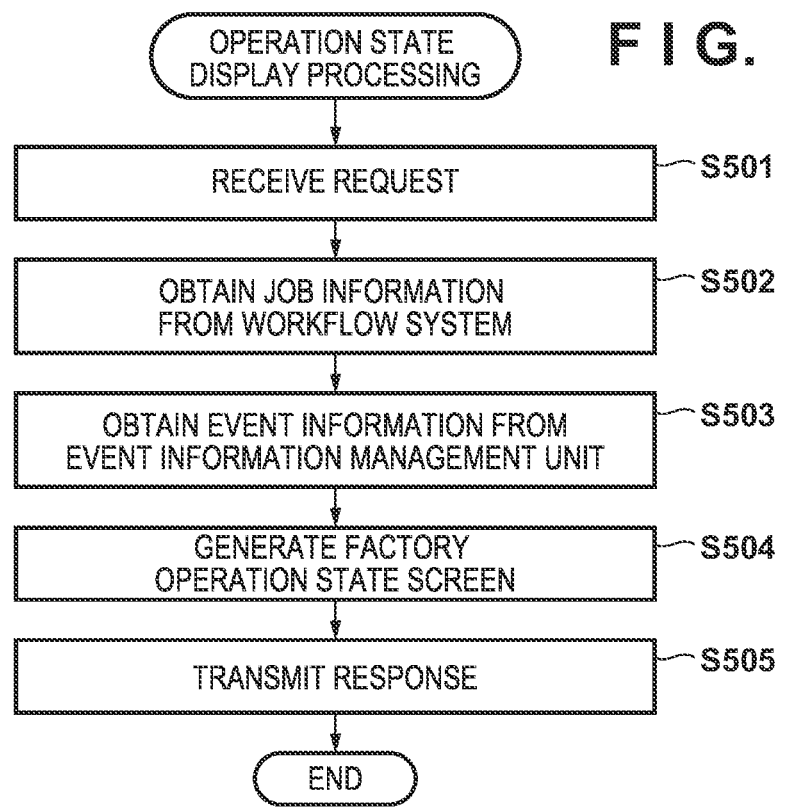
FIG. 5 is a flowchart for explaining an operation state screen generating method according to this embodiment.

FIG. 5 is a flowchart in which the DB 106 generates an operation state screen concerning a printing factory.

In step S501, the operation state generating unit 343 of the DB 106 receives an operation state screen generation request from a client PC (not shown) via the communication unit 341.

In step S502, the operation state generating unit 343 obtains job information from the workflow system 101. The job information includes device IDs, start dates and times, and end dates and times. This information indicates a specific time zone in which each device has operated.

In step S503, the operation state generating unit 343 obtains event information via the event information management unit 342. The event information includes detection start dates and times, detection end dates and times, and device IDs. This information indicates a specific time zone in which each device has performed a preprocessing operation.

In step S504, the operation state generating unit 343 generates an operation state screen 600 (to be described later). In step S505, the operation state generating unit 343 transmits the operation state screen as a response to a client PC. In the above manner, the DB 106 generates an operation state screen.

Figure 6:
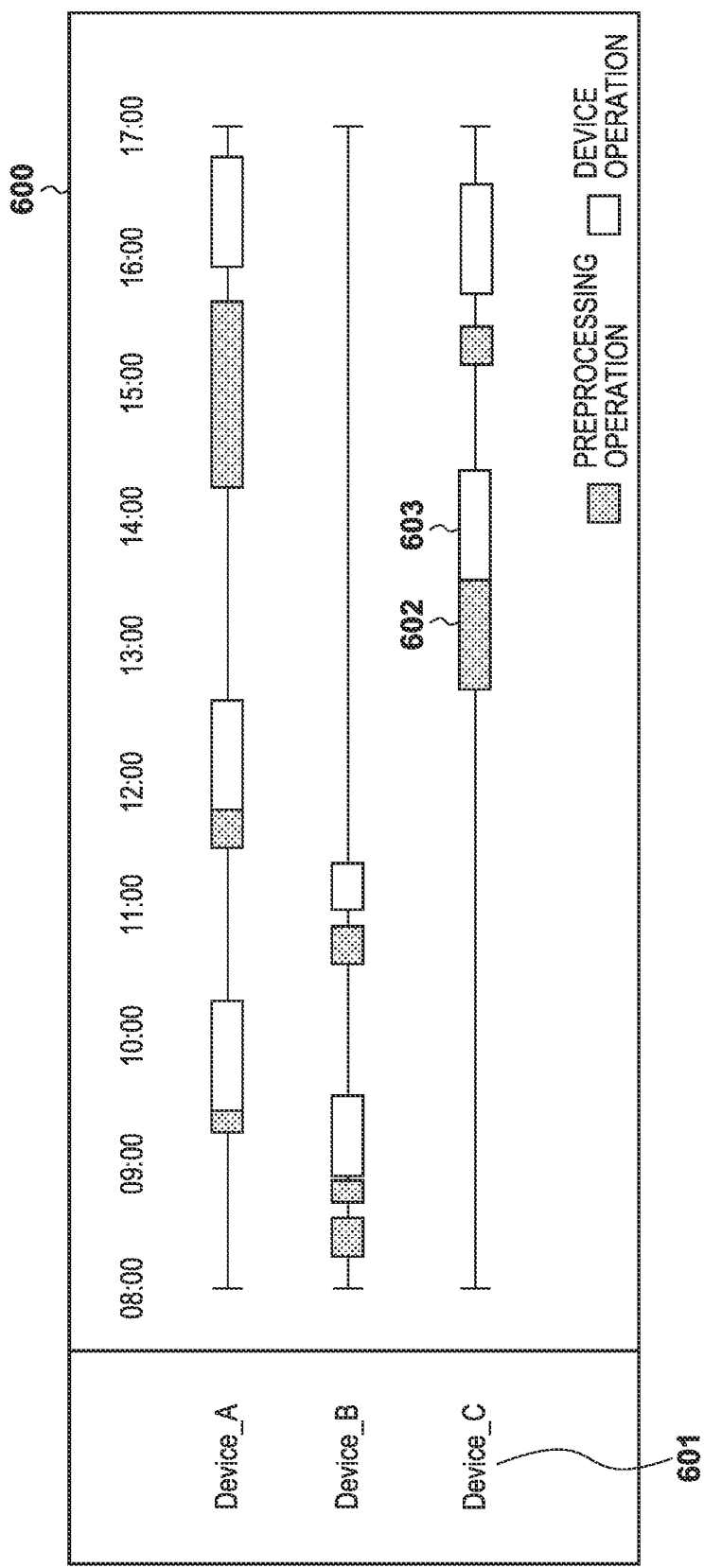
FIG. 6 is a view showing an example of an operation state screen according to this embodiment.

FIG. 6 shows an example of the operation state screen 600 generated by the operation state generating unit 343 in step S504 in FIG. 5. An area 601 is a device ID display portion. A time line 602 is a time line indicating a time zone in which each device has performed a preprocessing operation and is generated from the event information obtained in step S503. A time line 603 is a time line indicating a device operation time zone in each device, and is generated from the event information obtained in step S502.

A time indicating a preprocessing operation of an event that can be obtained from event information is discrete. This is because the camera management system 102 captures an image or video of each device at predetermined time intervals, and hence there are time zones in which no video is obtained.

For example, in the case of Table 3, in the preprocessing operation time of "Device_B", no preprocessing operation is performed between "2019-11-21T10:32:00Z" and "2019-11-21T10:34:00Z". This indicates that there is a blank time in this time because the network camera 103 neither performs image capturing nor obtains a captured video. For this reason, the operation state generating unit 343 may ignore a blank time within a predetermined time and regard that the preprocessing operation is continuous. This embodiment is configured to ignore a blank time within the capturing interval.

At this time, in the case of Table 3, assume that "Device_B" has performed one preprocessing operation between "2019-11-21T10:31:00Z" and "2019-11-21T10:35:00Z". In addition, assume that another preprocessing operation has been done between "2019-11-21T10:41:00Z" and "2019-11-21T10:45:00Z". The time between these periods is regarded as a time in which no preprocessing operation has been performed. This is because the time between the periods exceeds the capturing interval. Note that even if there is no time zone in which no video can be obtained, when a continuous video is analyzed at predetermined intervals as in the procedures in FIGS. 4A and 4B, a discrete analysis result like that illustrated in Table 3 is obtained.

This operation state screen makes it possible to grasp not only the operation states of devices but also the accurate operation state of a printing factory including preprocessing operations.

Second Embodiment

In the first embodiment, in steps S406 and S408 in FIG. 4A, a device with the status of the job information being "waiting" is always designated as a detection target, and video analysis is performed. Even if there is a process in "waiting" status concerning a given device, when the previous process is being executed, a preprocessing operation in the "waiting" process concerning the device is rarely performed until the processing in the previous process is completed. This is because an output from the process tends to become a processing target in the next process. Accordingly, this embodiment will exemplify a case in which detection is more efficiently performed by determining, based on the status of preprocessing in a process of interest (or a reference process), whether a monitoring target device is to be detected. Note that a description of the same part as that of the first embodiment will be omitted.

Figure 7:
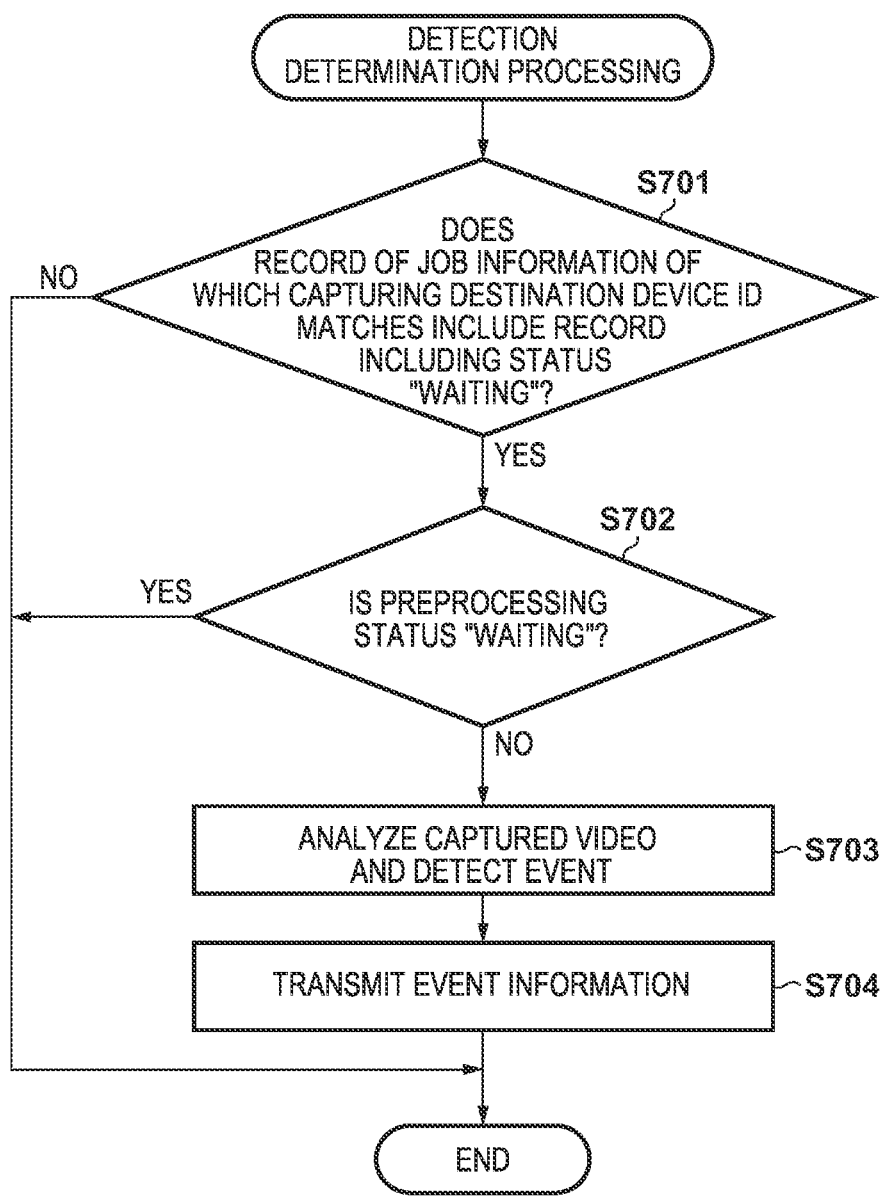
FIG. 7 is a flowchart for explaining a detection determination method according to the second embodiment.

FIG. 7 is a flowchart for explaining a detection determination method in a camera management system 102 according to this embodiment. Steps S701, S703, and S704 are respectively the same as steps S411, S412, and S413, and hence a description of them will be omitted. In this embodiment, the processing in FIG. 7 is executed in place of the processing in FIG. 4B according to the first embodiment.

If there is a record with the status "waiting" in step S701, it is determined that there is a possibility that a preprocessing operation is performed, and step S702 is executed. In this case, in step S701, the record with the status "waiting" is a reference process record.

In step S702, a detection control unit 317 obtains a record of job information including a job ID matching a reference process record and preceding the reference process record. In this embodiment, whether a given process is a previous process can be discriminated by comparing the magnitudes of the process IDs. The detection control unit 317 determines in step S702 whether the status of the obtained record of the previous process is "waiting".

If it is determined in step S702 that the status is "waiting", the detection control unit 317 terminates the processing. If the status is "in progress" or "normal termination", the processing in step S703 is executed. In this case, if there are a plurality of processes before the reference process and if the status of one of the processes is "waiting", "waiting" may be determined in step S702.

Detection processing can be skipped for even a device for which the status is determined as "waiting" in step S702 and which is determined as a detection target in step S701 until processing in the previous process is completed. Reducing video analysis on areas where a preprocessing operation is not likely to be performed can lead to more efficient video analysis.

Third Embodiment

The first and second embodiments have exemplified the methods for efficiently obtaining information about preprocessing operations. For this reason, according to the first and second embodiments, no capturing is performed if it is determined in step S701 that all the statuses of job information are "normal termination", that is, no capturing is performed for a device that is not planned to be operated.

The third embodiment described below is an embodiment that can improve productivity, including postprocessing operations, by also efficiently obtaining information about postprocessing operations. Some device is configured to perform an operation as a postprocessing operation even after the completion of all jobs depending on the type of postprocessor. In the case of a cutting machine, a chip receptor cleaning operation is such an operation. This embodiment will exemplify a case in which setting a device, as a video analysis target, from which an event is to be detected even after the completion of all operation jobs will also obtain information about postprocessing operations. Note that a description of the same part as that of the second embodiment will be omitted.

Figure 8:
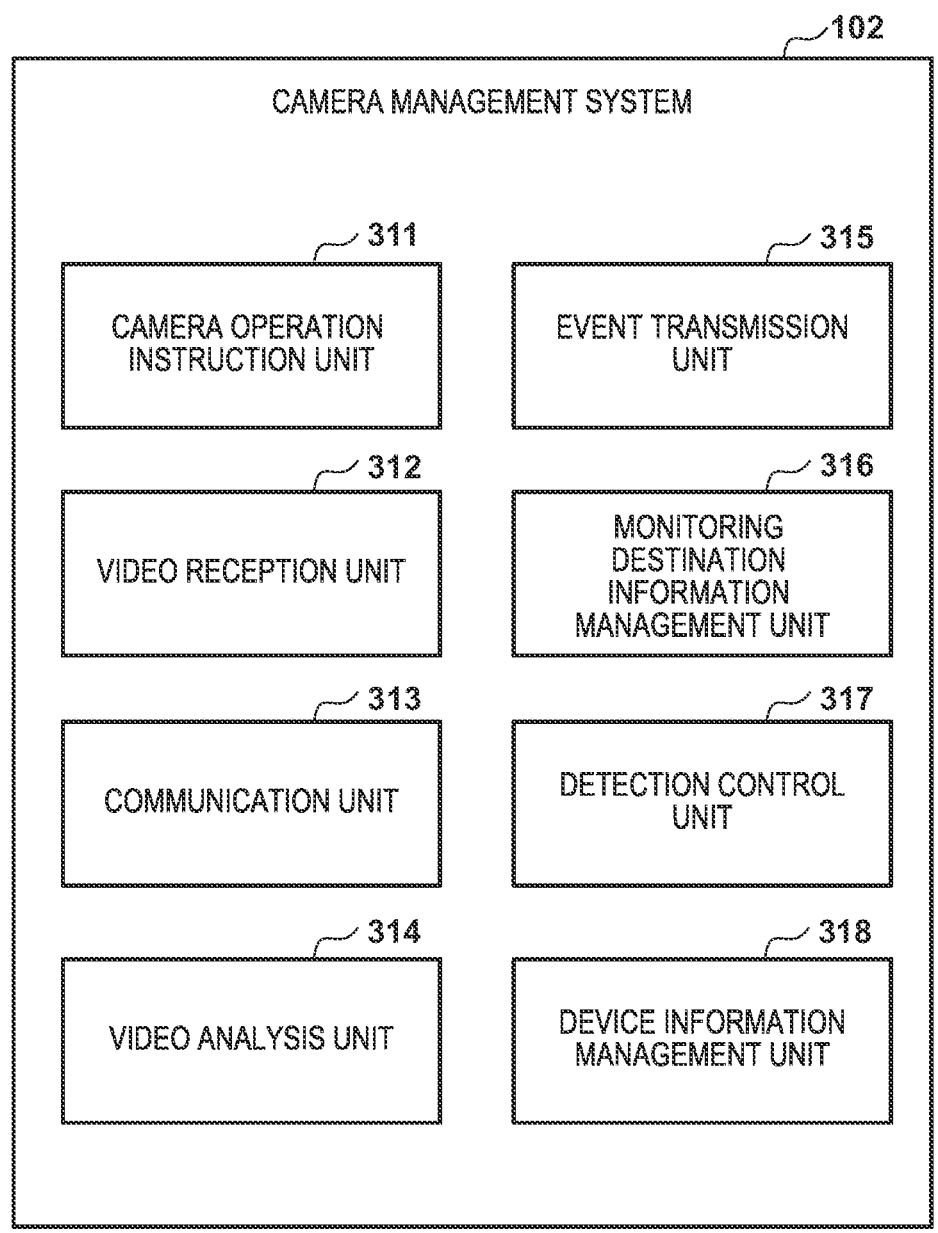
FIG. 8 is a block diagram showing the software configuration of a camera management system 102 according to the third embodiment.

FIG. 8 shows the software configuration of a camera management system 102 according to this embodiment. The camera management system 102 includes a camera operation instruction unit 311, a video reception unit 312, a communication unit 313, a video analysis unit 314, an event transmission unit 315, a monitoring target information management unit 316, a detection control unit 317, and a device information management unit 318. Table 4 illustrates an example of the device information managed by the device information management unit 318.

TABLE 4

| Device ID | Device Type |
|---|---|
| Device_A | printer |
| Device_B | cutting machine |
| Device_C | bookbinding machine |

Device information is constituted by device IDs for uniquely identifying a printer 104 and a postprocessor 105 and device types such as a printer, a cutting machine, and a bookbinding machine.

Figure 9:
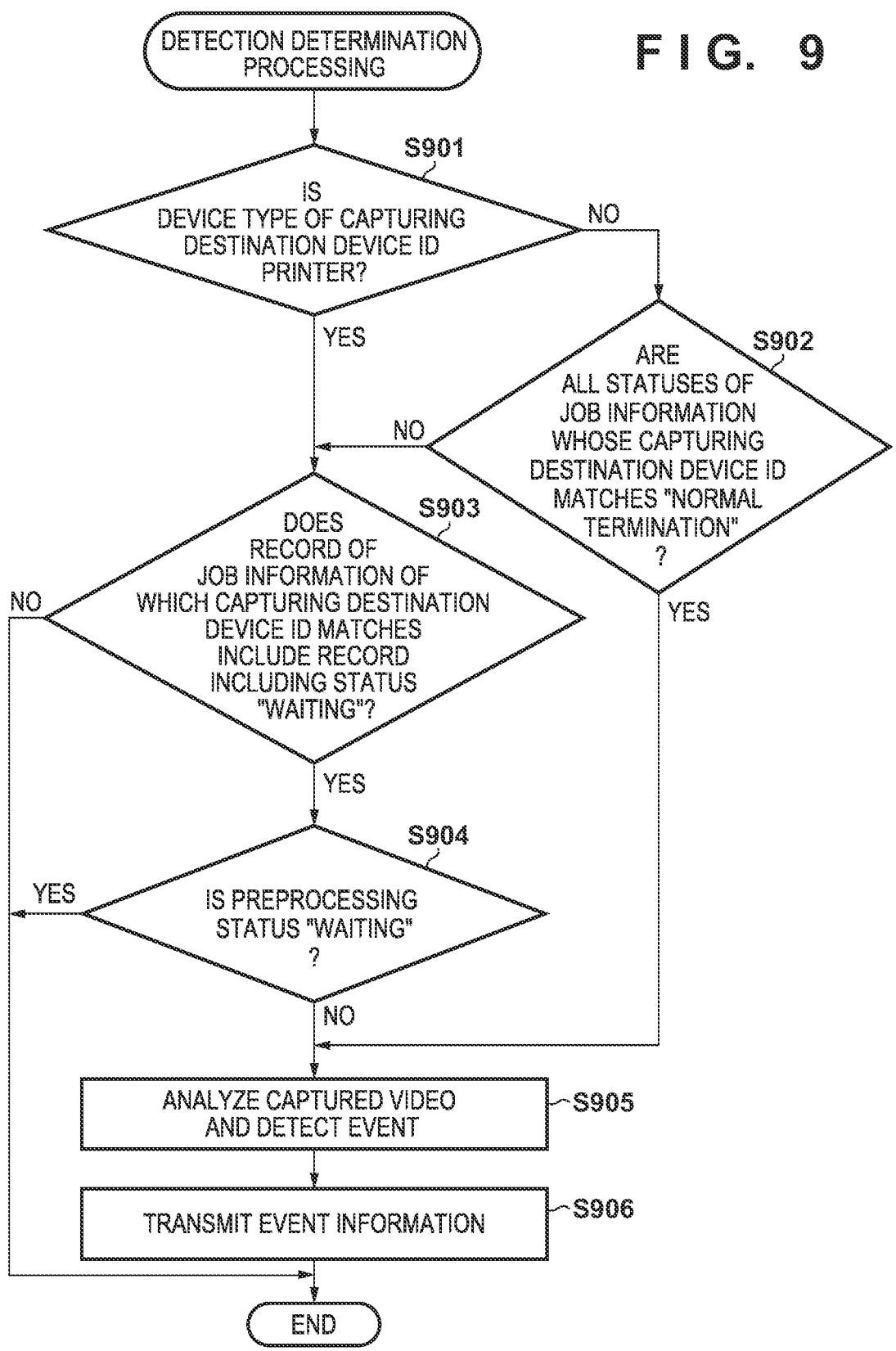
FIG. 9 is a flowchart for explaining a detection determination method according to the third embodiment.

FIG. 9 is a flowchart for explaining a detection determination method in the camera management system 102 according to this embodiment. Steps S903 to S906 are respectively the same as steps S701 to S704, and hence a description of them will be omitted. In this embodiment, the processing in FIG. 9 is executed in place of the processing in FIG. 7 according to the second embodiment.

In step S901, the detection control unit 317 obtains a device type of device information which matches the device ID at a monitoring target included in monitoring target settings via the device information management unit 318, and discriminates whether the device is a printer. In this embodiment, the processing to be performed is switched depending on whether a given device type is a printer. However, the device type may be other than a printer. Upon determining in step S901 that the device is a printer, the detection control unit 317 executes the processing in step S903. Upon determining in step S901 that the device type is not a printer, the detection control unit 317 executes step S902.

In step S902, the detection control unit 317 checks whether all the statuses of information of the job information obtained in step S406 or S408 which the monitoring target device IDs included in monitoring target settings match are "normal termination". If, for example, the monitoring target device ID included in the monitoring target settings is "Device_B" and if the job information is in a state like that illustrated in Table 1, the detection control unit 317 determines that all the statuses are "normal termination". Upon determining in step S902 that all the statuses are "normal termination", the detection control unit 317 executes the processing in step S905 (to be described later). If NO in step S902, the detection control unit 317 executes the processing in step S903. Assume that it is determined in steps S901 and S902 that the statues of all the devices are "normal termination". Even in this case, if there is a device for which event detection in a preprocessing operation is to be continued, continuing detection processing can reduce the overlooking of changes in operation state. Note that it is determined in step S901 whether a capturing target device is a printer, and the process branches to step S902 if the device is other than a printer. Alternatively, it may be determined in step S901 whether a capturing target device is a device that requires a post-operation after processing, for example, a cutting machine, and the process may branch to step S902 if the capturing target device is the corresponding device. This configuration makes it possible to continue monitoring even after the completion of a job concerning a device that requires a post-operation.

FIG. 10 is a plan view showing an example of the video captured by a network camera 103 according to this embodiment. A printer 104 and a postprocessor 105 are arranged in a work room. FIG. 10 illustrates a worker 1001. The first to third embodiments each have exemplified the event collection method in the case of three devices. When there are many devices as shown in FIG. 10, because there are also many areas where events should be detected, the present invention can obtain more effects.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is not limited to the above embodiments and various changes and modifications can be made within the spirit and scope of the present invention. Therefore, to apprise the public of the scope of the present invention, the following claims are made.

This application claims the benefit of Japanese Patent Application No. 2020-020894, filed Feb. 10, 2020 which is hereby incorporated by reference herein in its entirety.

What is claimed is:

1. A monitoring control apparatus comprising:
   at least one memory; and
   at least one processor,
   wherein the monitoring control apparatus stores monitoring target information including identification information of each device to be monitored and each area corresponding to the device for each image capturing unit and job information including identification information of a device used for each job and a state of the device,
   wherein when executing at least one program stored in the at least one memory, the at least one program causes the at least one processor to perform:
   updating the state of the device in the job information according to a device operation state notification from the device;
   receiving videos captured by the image capturing unit, the videos including an image of a target device determined from among the devices whose identification information is included in the monitoring target information;
   detecting an event concerning the target device from the area corresponding to the target device from the video captured by the image capturing unit in a case where a job of which the state of the target device is a waiting state is included in the job information, and
   detecting an event concerning the target device from the area corresponding to the target device from the video captured by the image capturing unit in a case where a job of which the state of the target device is a waiting state is not included in the job information obtained after receiving the video when a job of which the state of the target device is a waiting state is not included in the job information obtained before receiving the video,
   wherein detection of an event concerning the target device is not performed in a case where a job of which the state of the target device is a waiting state is not included in the job information, and
   a next target device is determined in accordance with the predetermined order.

2. The apparatus according to claim 1, wherein the target device is monitored in a case where the target device is a predetermined type of device and in a case where all jobs using the target device are completed.

3. The apparatus according to claim 1, wherein a video of a predetermined time is captured with the image capturing unit,
   the event concerning the target device is detected in a case where a job in which a state of the target device is a waiting state is included in the job information obtained before receiving the video, and
   when the event is not detected based on the state of the target device before receiving the video, an event concerning the target device is detected in a case where a job in which a state of the target device is a waiting state is included in the job information obtained after receiving the video.

4. The apparatus according to claim 1, wherein event is detected by detecting a predetermined target from the video.

5. The apparatus according to claim 4, wherein the predetermined target includes one of a worker and lighting of a lamp of the target device.

6. The apparatus according to claim 1, wherein the at least one program causes the at least one processor to perform:
   transmitting the detected event to an information processing apparatus that displays the event on a user interface.

7. A monitoring system comprising:
   a monitoring control apparatus;
   an image capturing apparatus configured to capture an image of a monitoring target device; and
   an information processing apparatus configured to receive an event from the monitoring control apparatus and display the event on a user interface,
   wherein the monitoring control apparatus includes
   at least one memory; and
   at least one processor,
   wherein the monitoring control apparatus stores monitoring target information including identification information of each device to be monitored and each area corresponding to the device for each image capturing unit and job information including identification information of a device used for each job and a state of the device,
   wherein when executing at least one program stored in the at least one memory, the at least one program causes the at least one processor to perform:
   updating the state of the device in the job information according to a device operation state notification from the device;
   receiving videos captured by the image capturing unit, the videos including an image of a target device determined from among the devices whose identification information is included in the monitoring target information;
   detecting an event concerning the target device from the area corresponding to the target device from the video captured by the image capturing unit in a case where a job of which the state of the target device is a waiting state is included in the job information, and
   detecting an event concerning the target device from the area corresponding to the target device from the video captured by the image capturing unit in a case where a job of which the state of the target device is a waiting state is not included in the job information obtained after receiving the video when a job of which the state of the target device is a waiting state is not included in the job information obtained before receiving the video,
   wherein detection of an event concerning the target device is not performed in a case where a job of which the state of the target device is a waiting state is not included in the job information, and
   a next target device is determined in accordance with the predetermined order.

8. A non-transitory computer-readable medium storing program instructions that cause a computer to execute operations when executed by the computer, the operations including:
   updating the state of a device in the job information according to a device operation state notification from the device;
   receiving videos captured by an image capturing unit, the videos including an image of a target device determined from among the devices whose identification information is included in the monitoring target information,
   detecting an event concerning the target device from the area corresponding to the target device from the video captured by the image capturing unit in a case where a job of which the state of the target device is a waiting state is included in the job information, and detecting an event concerning the target device from the area corresponding to the target device from the video captured by the image capturing unit in a case where a job of which the state of the target device is a waiting state is not included in the job information obtained after receiving the video when a job of which the state of the target device is a waiting state is not included in the job information obtained before receiving the video, wherein a next target device is determined in accordance with the predetermined order.

9. A monitoring control method executed by a monitoring control apparatus, the method comprising:

updating the state of the device in the job information according to a device operation state notification from the device;

receiving videos captured by an image capturing unit, the videos including an image of a target device determined from among the devices whose identification information is included in the monitoring target information, detecting an event concerning the target device from the area corresponding to the target device from the video captured by the image capturing unit in a case where a job of which the state of the target device is a waiting state is included in the job information, and detecting an event concerning the target device from the area corresponding to the target device from the video captured by the image capturing unit in a case where a job of which the state of the target device is a waiting state is not included in the job information obtained after receiving the video when a job of which the state of the target device is a waiting state is not included in the job information obtained before receiving the video, wherein a next target device is determined in accordance with the predetermined order.

* * * * *